(12) United States Patent
Pellerin

(10) Patent No.: US 6,411,916 B1
(45) Date of Patent: Jun. 25, 2002

(54) FOOD SAFETY CONTROL METHOD AND APPARATUS

(75) Inventor: Henry R. Pellerin, Greenville, SC (US)

(73) Assignee: Hill Phoenix, Inc., Conyers, GA (US)

( * ) Notice: Subject to any disclaimer, the term of this patent is extended or adjusted under 35 U.S.C. 154(b) by 0 days.

(21) Appl. No.: 09/473,342

(22) Filed: Dec. 28, 1999

(51) Int. Cl.⁷ .............................................. G01K 13/00
(52) U.S. Cl. ..................... 702/130; 702/99; 702/104; 340/615; 340/622
(58) Field of Search ................... 702/99, 104, 130–132, 702/136, 182, 188; 340/286.09, 500–501, 825.06, 515, 517, 589, 615, 622; 426/231–233, 109, 110, 113

(56) References Cited

U.S. PATENT DOCUMENTS

| | | | |
|---|---|---|---|
| 4,102,194 A | 7/1978 | Eng | 73/340 |
| 4,567,474 A | 1/1986 | Wolin | 340/584 |
| 4,574,871 A | 3/1986 | Parkinson et al. | 165/1 |
| 5,262,758 A | 11/1993 | Nam et al. | 340/588 |
| 5,313,848 A | 5/1994 | Santin et al. | 73/866.2 |
| 5,424,720 A | 6/1995 | Kirkpatrick | 340/585 |
| 5,764,928 A | 6/1998 | Lanctot | 395/285 |
| 5,798,694 A | 8/1998 | Reber et al. | 340/540 |
| RE36,200 E | 4/1999 | Berrian et al. | 73/866.2 |
| 5,900,801 A * | 5/1999 | Heagle et al. | 340/573.1 |
| 5,939,974 A * | 8/1999 | Heagle et al. | 340/286.09 |
| 5,991,025 A * | 11/1999 | Wright et al. | 356/328 |

* cited by examiner

Primary Examiner—Bryan Bui
(74) Attorney, Agent, or Firm—John B. Hardaway, III; Nexsen Pruet Jacobs & Pollard, LLC

(57) ABSTRACT

A method of tracking and monitoring the temperature of a food product from point of origin until it is removed from the display case by the consumer for immediate transport to the point of sale. As a plurality of food products are delivered to a store and put into a storage facility, a sensor is associated with a group of food products. The sensor is adapted to simulate the temperatures of the associated products using "learning algorithms". As the food products are removed from storage to the preparation area, the sensor is also moved to the preparation area. During preparation, the temperature data may be added to the product label. Then, the product is loaded into a display fixture. The display fixture has a network interface that activates a cooling system for the display fixture upon activation by the sensor.

20 Claims, 7 Drawing Sheets

FOOD SAFETY CONTROL METHOD AND APPARATUS

BACKGROUND OF THE INVENTION

The present invention is generally related to data management in handling of food products. More specifically, the present invention is related to a method and apparatus for obtaining temperature history data on food products.

Certain food products must be maintained within a particular range of temperatures or they will spoil. Spoiled food products can cause sickness and death if consumed. If not consumed, spoilage results in waste that must be properly disposed of. Furthermore, a store that sells a food product that has not been maintained within the proper temperature range may be exposed to liability from its patrons and loss of reputation. Moreover, by failing to maintain food products within a required temperature range, the store may be violating a government food safety regulation which could result the imposition of sanctions; however, unless product temperatures are continuously monitored from the point of origin through to the point of sale, verification that the product has been maintained within the proper temperatures is at best only inferential.

In order to help prevent contamination of food products by spoilage, it is customary to periodically check the temperature of the fixture that holds the food products. If the temperature rises to a certain temperature, the growth of micro-organisms is accelerated. Unfortunately, without actually without continuously monitoring of the actual product temperature, this type of monitoring does not yield accurate or complete temperature history information about the condition of the food products. Furthermore, there are typically periods of time prior to sale in which the temperature is not checked at all. As a result, there are gaps in the temperature information data during which the food product temperature could be outside the proper range and this event could go undetected.

Therefore, there is a need for a method and apparatus that monitors and tracks the temperature of a product continuously from the point of origin until it is removed from the display case by the consumer for immediate transport to the point of sale.

SUMMARY OF THE INVENTION

According to its major aspects and briefly recited, the present invention is a data management method and apparatus that provides better information and control over food products prior to sale to consumers. In a preferred embodiment, the apparatus includes a sensor that is associated with the food product when received, distributed or produced and that remains with the food product as it moves through the receiving, distribution, storage, preparation and merchandising steps of the retail process. The sensor is also in electronic communication with a data management system for storing the product temperature data for later downloading to the data management system as soon as the food product is received until it is removed from the display case by the consumer. The data management system receives the temperature data from the sensor. A network device connected to the data management system and display device performs a variety of functions including control and information output. The sensor measures or simulates product temperatures and transmits temperature information associated with the product to the data management system where it is recorded for later retrieval used for logical decisions such as control outputs and/or alarm and indication. The sensor is preferably capable of implementing computer algorithms to mimic the temperature of the product rather than solely the temperature of the product's environment. The sensor also has various indicators to inform the user of the status of the sensor and the product's temperature.

An important feature of the present invention is the recording of temperature data continuously from the point of origin until it is sold so that the seller and buyer can be assured that the product was stored and displayed at the proper temperature.

Another important feature of the present invention is the ability of the sensor to determine product temperature rather than solely the ambient temperature in the vicinity of the product. It accomplishes this by directly sensing the product temperature using the external probe or by use of algorithms benchmarked with real data for each product.

Still another important feature of the present invention is the use of the weigh scale/price printer to print out information about the product's temperature history, proper handling instructions, preparation instructions, medical information and other information related to product for the customer so that the customer can verify that the temperature of the product was maintained within the specified range.

Other features and their advantages will be apparent to those skilled in the art of food product handling from a careful reading of the Detailed Description of Preferred Embodiments accompanied by the following drawings.

DETAILED DESCRIPTION

The present invention is a method of tracking and monitoring the temperature of a food product from point of origin until the point of sale. Although the present invention is described with reference to food products, it is anticipated that the method could track the temperatures of other materials, which may not be food products or edible. For example, the present method and apparatus may be adapted easily for medications or for chemical ingredients in manufacturing processes where the medications and ingredient need to be maintained within narrow temperature regimes for best effectiveness. Furthermore, the present method and apparatus could also be modified to track other parameters, such as exposure of food products to oxygen.

Figure 1:
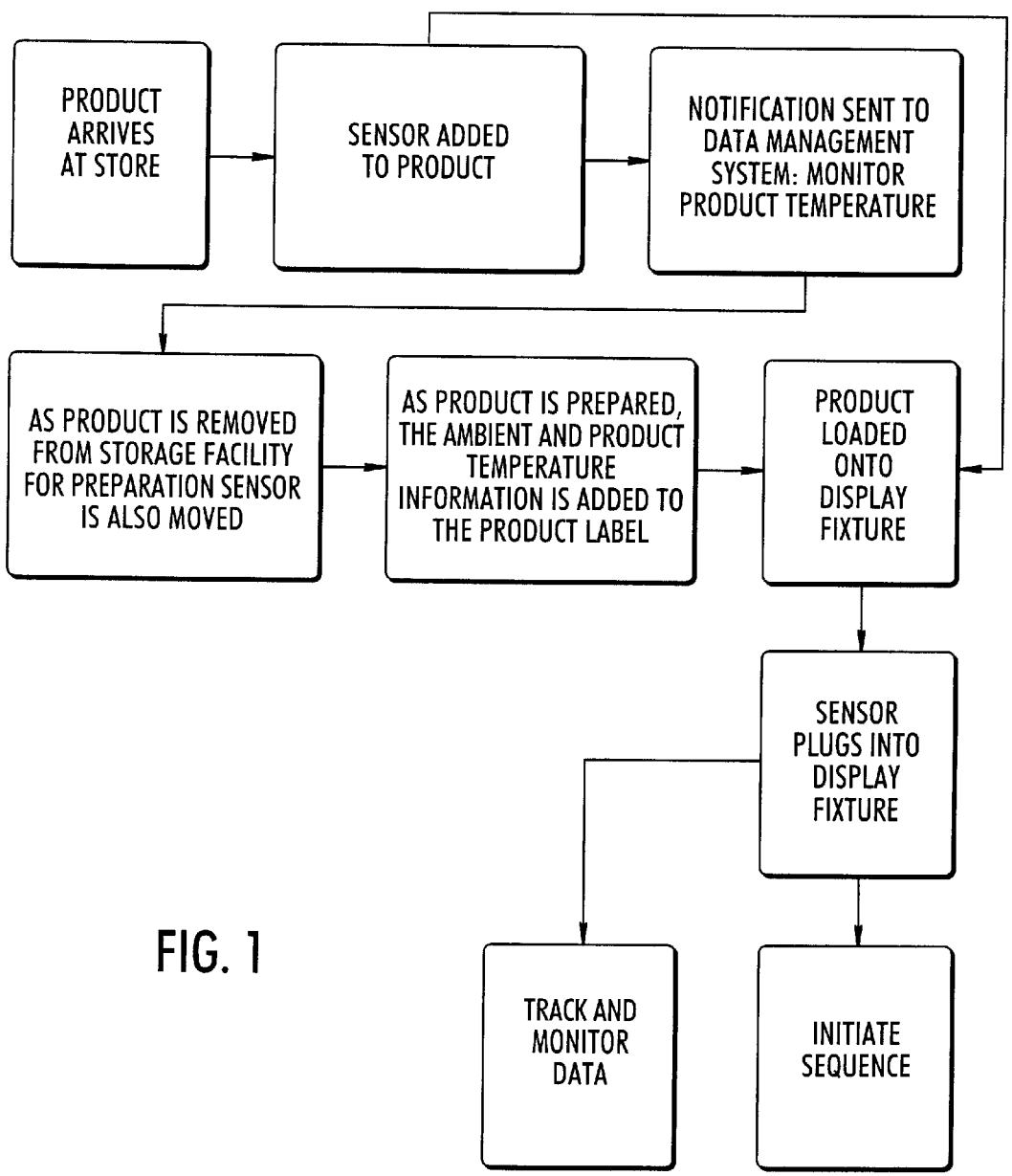
FIG. 1 is a flow chart of the food safety method, according to a preferred embodiment of the present invention.

FIG. 1 illustrates the overall method of the present invention. As food products are delivered to a store and put into a storage facility, sensors 100 are associated with individual products or groups of food products. By the term "store" it is meant any facility in the distribution chain, not solely a retail outlet where consumers purchase products for home or institutional use. A "storage facility" is an area within a store where the thermal environment may be controlled separately from that in the balance of the store. A group of products may, for example, be a box of oranges that will be sold as a unit or individually or a side of beef, which will later be subdivided. Sensor 100 is associated with a product when it is sufficiently proximate that it is exposed to substantially the same thermal environment, preferably within a few feet of the product.

The data management system is then notified by the sensor 100 that the association of that particular sensor 100 with a food product or group of food products has taken place and the data management system is to commence monitoring product temperature.

Sensor 100 is adapted to simulate the temperatures of the associated products from the temperature of the immediate vicinity of the product using "learning algorithms", as will be explained more fully below. As the food products are removed from storage and taken to the preparation area (alternatively, are taken to the display area) or are placed directly in the preparation area upon arrival, sensors 100 are also moved to the preparation area. During preparation, temperature data showing the temperature history of the product from the time of arrival at the store may be added to the product label.

Then the product is loaded into a display fixture 90, such as a refrigerated bin, refrigerated display case or cooler. The product label containing the temperature data may be printed using a conventional weigh scale with built-in printer programmed to add the temperature data. If a product is subdivided, new sensors 100 are added to the subdivided portions. Display fixture 90 has a network interface 80 that queries sensors 100 within display fixture 90 to see if the thermal environment in display fixture 90 is being kept sufficiently cool to assure that product temperature is within the preselected range. Depending upon the temperature readings of sensor 100, the thermal environment within display fixture 90 could be adjusted up or down accordingly. At the point of sale, a label is optionally printed with the appropriate data using a printer at the cash register so that the customer will be able to know the temperature history of the product. Instead of printing the appropriate data, this information could be communicated with the customer using other methods of communication, such as e-mail. This data is also recorded in the data management system and can be associated with an identifying number for the customer, such as a credit card number or receipt number.

Figure 2:
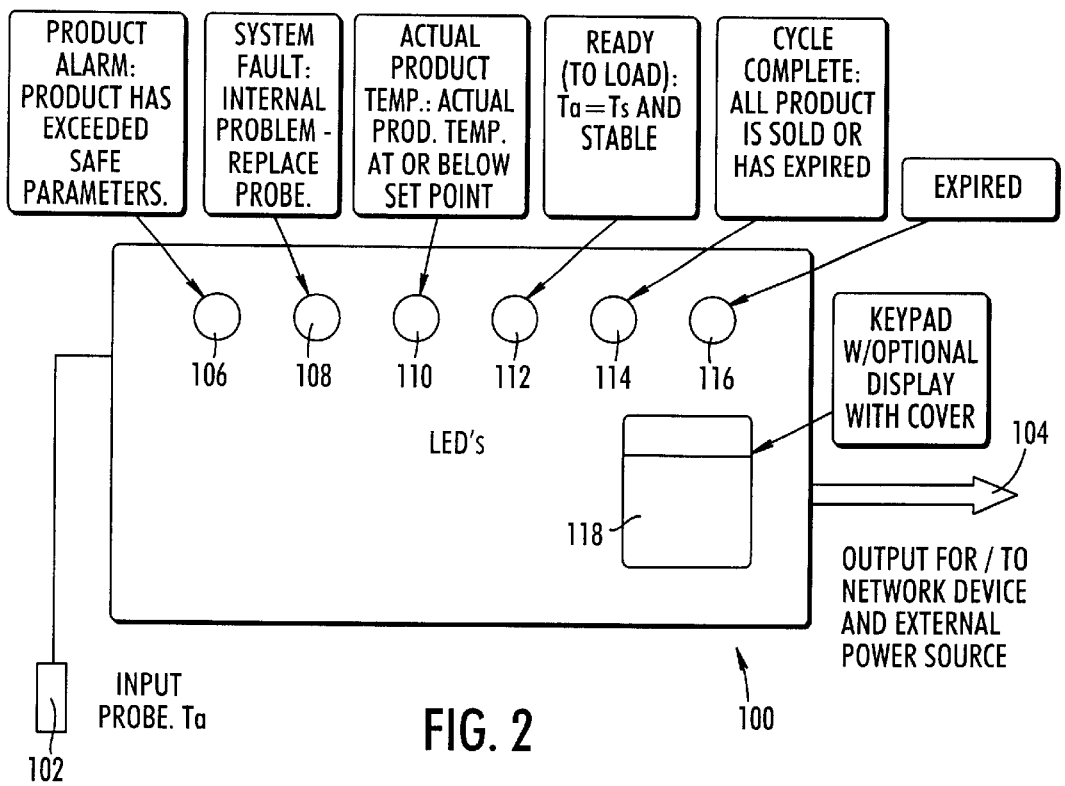
FIG. 2 is a schematic representation of the sensor, according to a preferred embodiment of the present invention.

FIG. 2 is a schematic representation of the sensor of the present invention.

Sensor 100 is a temperature tracking device that remains associated with the food product as it moves through all process steps and is capable of operating in a refrigerated environment. Sensor 100 has onboard memory in order to store temperature data as a function of time. Alternatively, sensor 100 could transmit temperature data using an infrared transmitter, radiowave transmitter or hard wire transmission to a data management system that tracks the temperature of plural sensors. Depending upon the temperature data, sensor 100 also provides a visual or aural indication for store workers to perform specific actions with respect to the product.

Sensor 100 has a removable input probe 102 that is applied to a product so that it can sense the actual temperature ($T_a$) of the product. The temperature of input probe $T_a$ is compared with the temperature of sensor ($T_s$) which is sensing the ambient temperature in the vicinity of the product. The relationship between the two temperatures in terms of difference and the rate of movement of $T_a$ following a movement in $T_s$ is established. At this point, input probe 102 can be removed from the product and sensor 100 can then simulate the product temperature of the group of products associated with sensor 100 based $T_s$, the temperature in the immediate vicinity of the products. With this information, sensor 100 contains "self-learning" algorithms benchmarked with real product temperature data that correct the simulated temperature. Until the temperature of $T_a$ is able to be simulated by sensor 100 using $T_s$, the temperature reading of $T_a$ is sent to the network for recording. Thus, the network recorded temperature of a product is either its actual temperature or a corrected, simulated product temperature.

Sensor 100 has an output interface 104 that allows connection to a network device, so that temperature data can be transmitted to any device on the network, such as a scale. Output interface 104 could be any network interface known in the art, such as a hardwire with a plug, infrared, radio communications, or the like.

Sensor 100 includes preferably six status-indicating, light emitting diodes (LEDs). Other indicators could be provided when additional information regarding the state of the product is desired. Instead of status LEDs, a liquid crystal display (LCD) or other display device could be easily substituted. A first status light 106 indicates whether the temperature of the product is outside of a preselected range, which can be based upon governmental or local guidelines. In order to set the temperature range, sensor 100 can be manually coded with product information, or product information can be downloaded across the network from the database management system. A second status light 108 indicates whether a fault, internal to sensor 100, has occurred. A third status light 110 indicates when actual product temperature, as sensed by input probe 102 is at or below the maximum temperature setpoint. Fourth status light 112 indicates when input probe 102 can be removed, and that sensor 100 can begin to simulate the product temperature. A fifth status light 114 indicates that either all the products that are associated with sensor 100 are sold or that the products associated with sensor have not been sold by the "sell by" date associated with the products and they should therefore be removed from the display. A sixth status light 116 indicates that the products associated with sensor have not been sold by the "sell by" date and should be removed.

Figure 3:
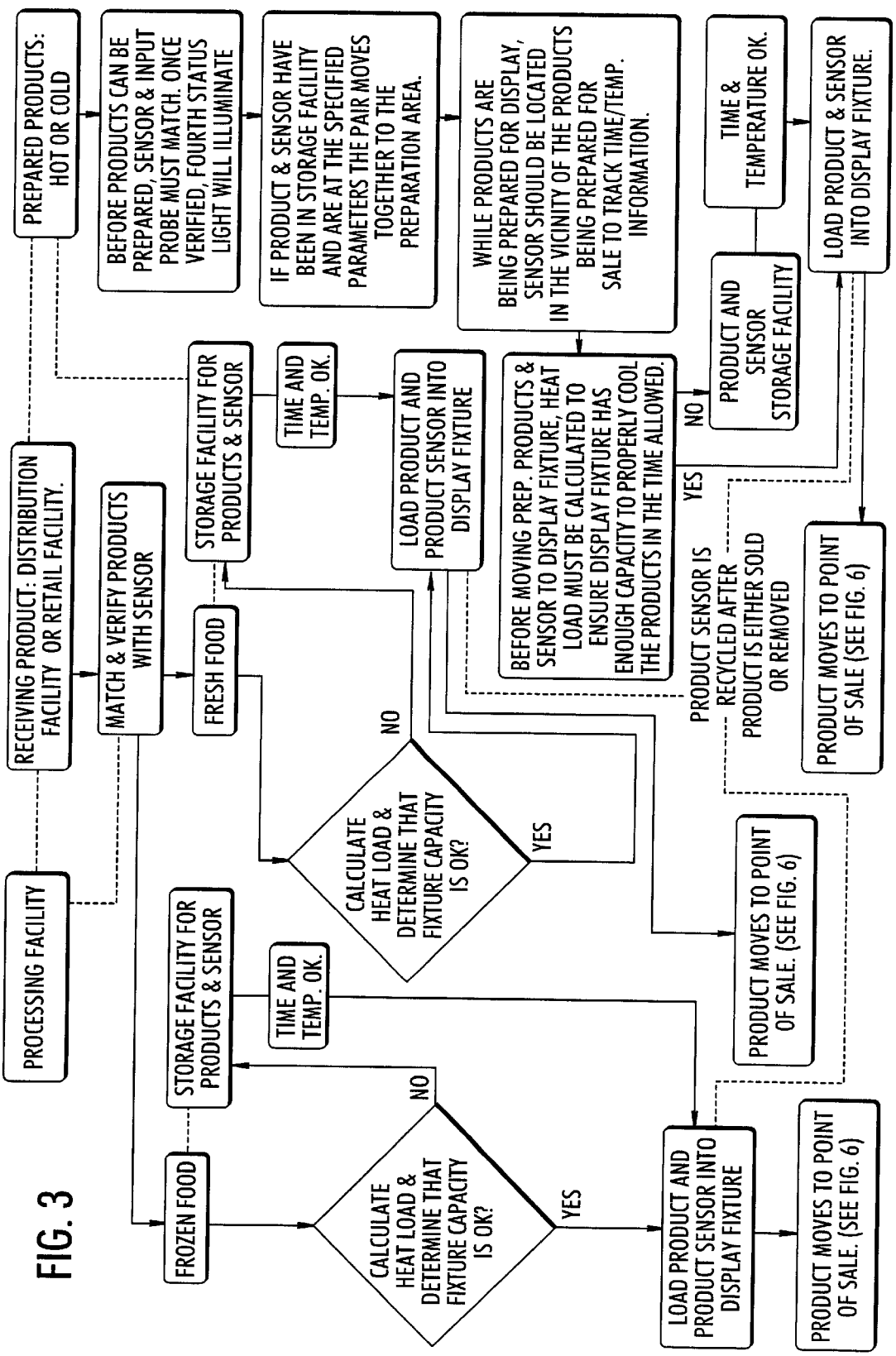
FIG. 3 is a flow chart of the method for loading of the display fixture, according to a preferred embodiment of the present invention.

Referring to FIG. 3, a flow chart illustrates the loading of the product in display fixture 90. Upon receipt, products are matched with sensors 100 in order to ensure that the temperature data being relayed corresponds to the correct product. During product unloading, sensor 100 continues to record the temperature of products, so that an optional alarm indicator 106 can be signaled if the temperature of the product falls or rises to a dangerous level. If the product is fresh food, sensor 100 with input probe 102 in product are placed within a storage facility until the temperature of input probe 102 and sensor 100 register the same temperature, which will be indicated by fourth status light 112 going on. At this point, products, along with sensor 100, may move to the preparation area. During preparation, sensor 100 should be placed in the immediate vicinity of products in order to track temperature data. Once the products are prepared, but prior to moving to the product display fixture, the heat load (which is the multiplicative product of the weight of the product, its specific heat and the difference in temperature between the preparation area and the display fixture) and the time required for the product to reach an unsafe temperature should be calculated to ensure that the display fixture has the capacity to cool the products in the time allowed. An audible alarm could be given if, prior to the time expiring, the product reaches unsafe temperature.

Figure 4:
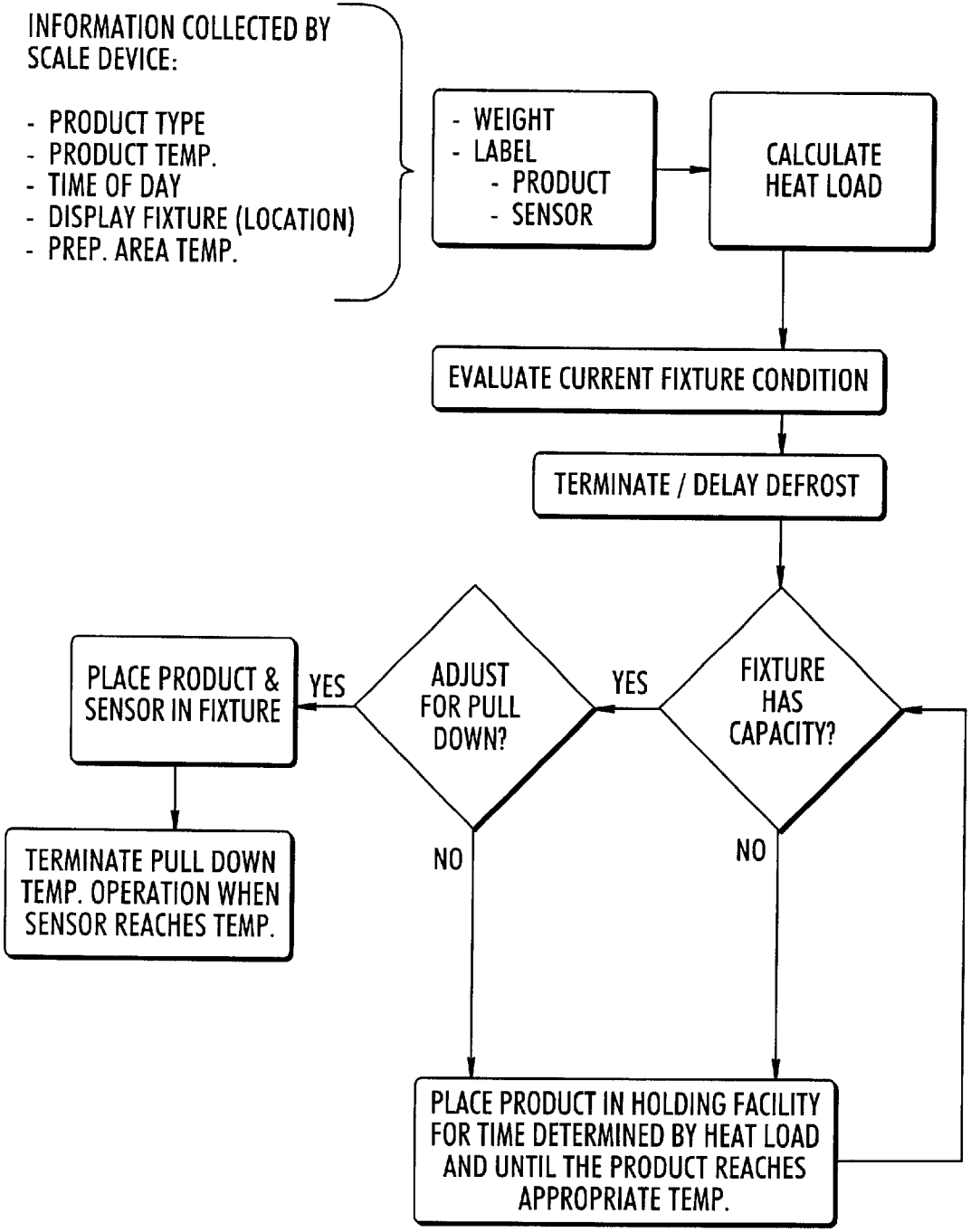
FIG. 4 is a detailed flow chart of the method for loading of the display fixture, according to a preferred embodiment of the present invention.

Referring to FIG. 4, the heat load calculation is made preferably by a weigh scale that is connected to the network. Scale collects information, such as the heat capacity of the product, from the network and measures weight to calculate heat load. The scale also preferably has a built-in printer to print labels for the products that contain temperature history data. Alternatively, scale could be connected to a printer on the network that would label products. If the display does not have the cooling capacity, the products should be placed along with sensor 100, back in storage facility until the display fixture has sufficient cooling power. Some display fixtures have adjustable temperature pull down capabilities. If that capability is present, it may be operated to increase cooling capability. If not, the user may simply chose to wait until the display fixture is sufficiently cool. At that point, the products, along with sensor 100, can be loaded into the display without fear that the display fixture will be unable to prevent the products from reaching a temperature outside the preselected range. If the heat load calculation initially indicates that the display fixture has sufficient cooling capacity, the product, along with sensor 100, can be placed into the display fixture.

If the products are frozen and therefore do not need to move to the preparation area, the heat load is again calculated, just as in the case of fresh food, using scale to ensure that the display fixture has the capacity to cool the frozen food products in the time allowed. If the display fixture does not have this capacity, the product is placed, along with sensor 100, back in storage facility until the display fixture has sufficient cooling power. If the display fixture has an adjustable temperature pull down operation, it may be used to increase its capacity to cool. At that point, the product is loaded, along with sensor 100, into the display fixture. If the heat load calculation initially indicates that the display has sufficient cooling power, the products are placed, along with sensor 100, into the display fixture directly.

Figure 5:
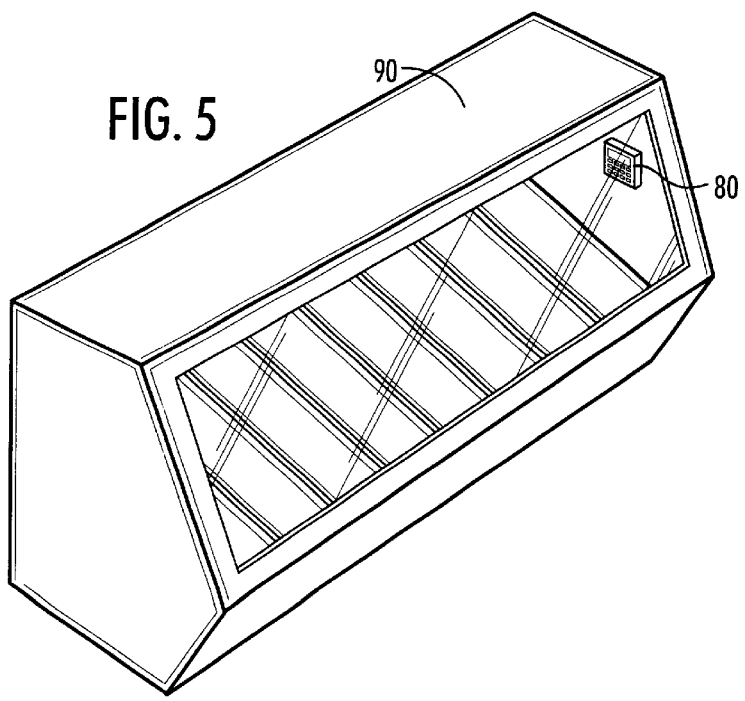
FIG. 5 is a schematic representation of the display fixture, according to a preferred embodiment of the present invention.

FIG. 5 is a perspective representation of the display fixture 90 of the present invention. Instead of having wires placed over the food products, the wiring is encased within the frame of display fixture 90. Sensor 100 is connected to a network interface 80, which optionally also provides power for sensor 100, so as to initiate cooling controls of display fixture 90. Network interface 80 could be any interface known in the art, such as infra-red, radio communication, serial connection and the like. Sensor 100 remains within display fixture 90 until either all associated products are sold or all remaining products have expired "sell by" dates, which is indicated by sixth status light 116.

Figure 6:
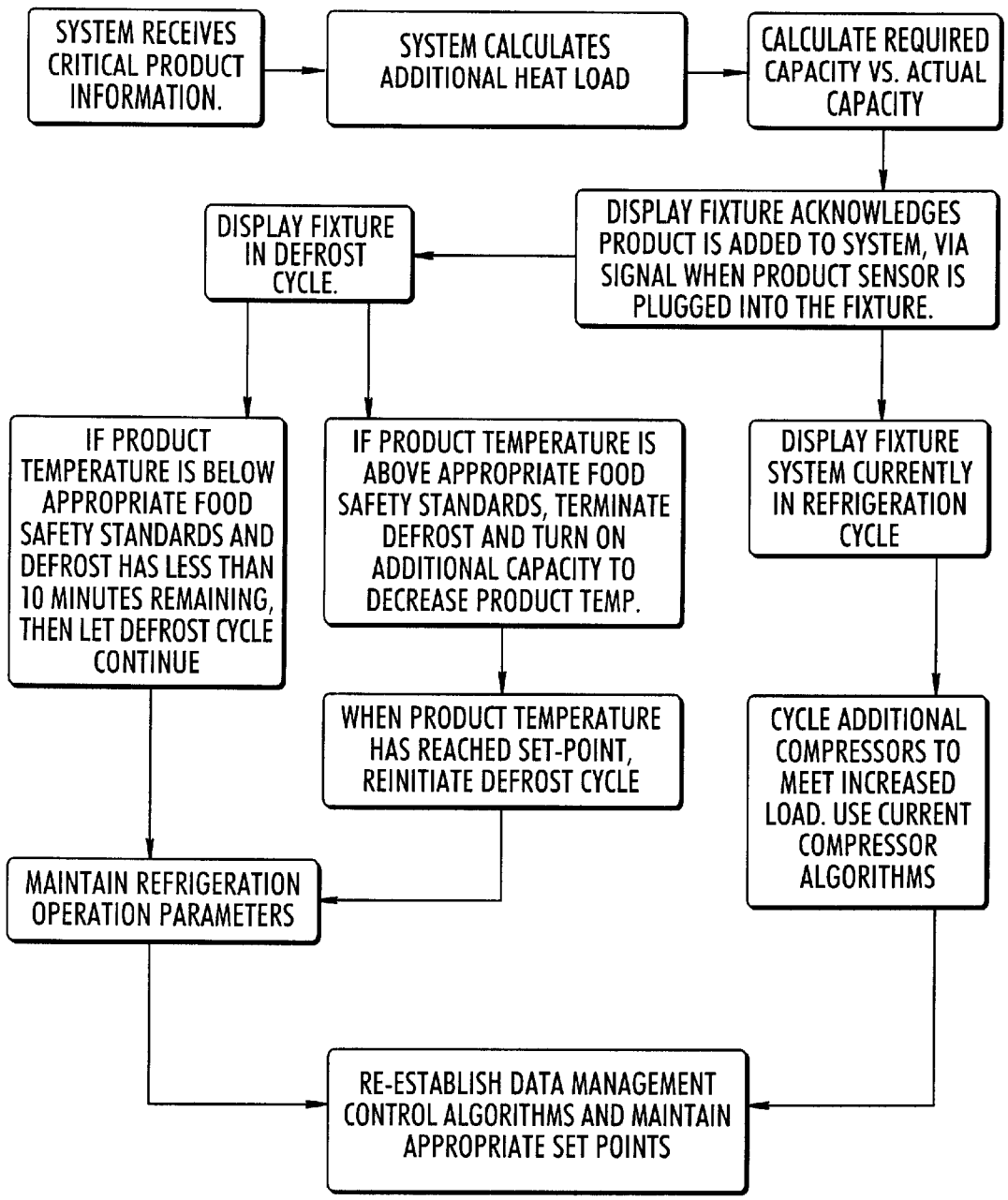
FIG. 6 is a flow chart of the method for controlling the display fixture environment during product storage, according to a preferred embodiment of the present invention.

FIG. 6 is a flow chart of the refrigeration control sequence of the display fixture 90. Connecting sensor 100 to network interface 80 within display fixture 90 initiates display fixture 90 to increase cooling capacity due to the additional products. Prior to loading products, display fixture 90 accesses information on the network to calculate to determine the capacity for additional products. If display fixture 90 is currently in refrigeration cycle, it will acknowledge the additional cooling requirements and cycle additional compressors to meet the increased load and then maintain the temperature of display fixture 90 within appropriate temperature set points. If display fixture 90 is in defrost cycle and product temperature is above the appropriate food safety standards, then display fixture 90 will terminate defrost and increase capacity to decrease product temperature. Upon reaching the appropriate temperature for the product, display fixture 90 will maintain the temperature within preselected parameters. If display fixture 90 is near the end of the defrost cycle and the product temperature is below the appropriate food safety standards, the defrost cycle will be allowed to run its course and display fixture 90 will then maintain the appropriate parameters for the product. The particular timing in the defrost cycle can be programmed by user or obtained from local or governmental recommendations for various display fixtures. The timing will vary between fixture style, product style, and means of defrosting.

Figure 7:
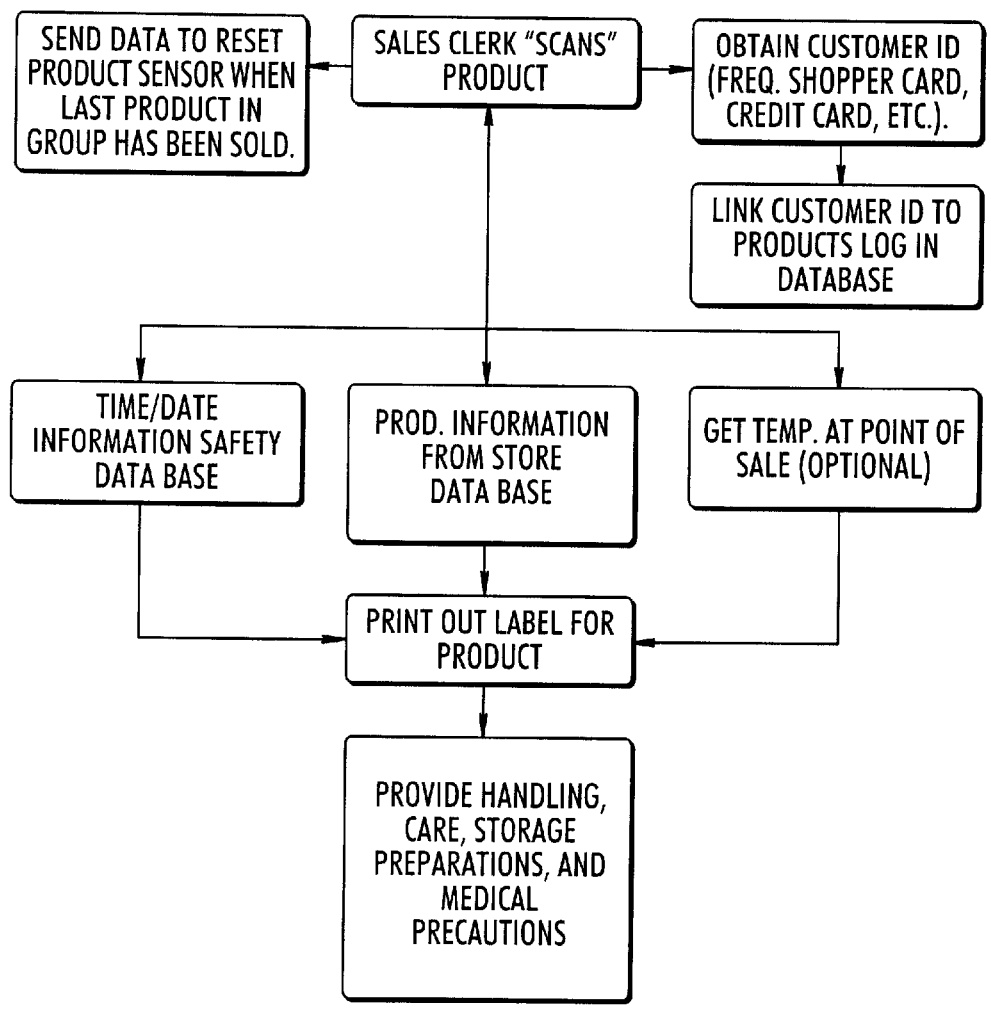
FIG. 7 is a flow chart of the method relating to the point of sale of the product, according to a preferred embodiment of the present invention.

FIG. 7 is a flow chart illustrating present invention relating to the point of sale of the product. When the sales clerk "scans" or otherwise identifies the product that is on the network, temperature/time data stored in the database will be queried for the product and will be printed on a product label, along with additional information about the product such as expiration date, prepared temperature/date, instructions for storage, preparations, handling and the like, Another option is to measure and record the product temperature at the point of sale and include this data in the temperature history of the product. The temperature could be measured using any technology available, such as infrared temperature sensing. In addition to the historical temperature data printed on the label, the current temperature reading of sensor 100 could also be printed. Instead communication this information to the customer via a printer, other forms of communication could also be used, such as e-mail. As the product is identified on the network by the sales clerk, data should be sent on the network to reset sensor 100 when the last product of the associated group has been sold.

Figure 8:
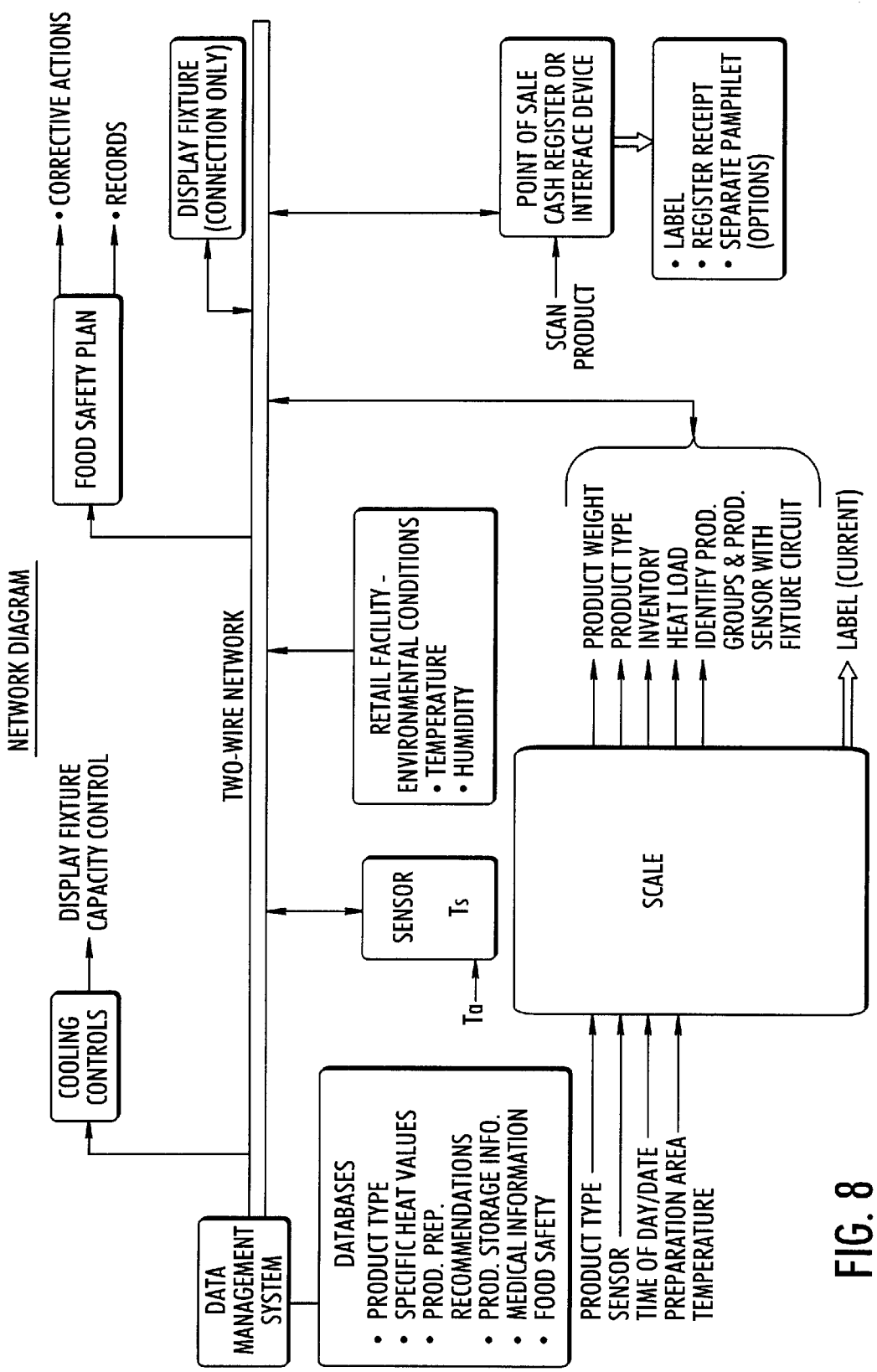
FIG. 8 is a schematic view of the operation of the network, according to a preferred embodiment of the present invention.

FIG. 8 is a flow chart of the operation of the network of the present invention. Several items will be networked to exchange information, including sensors, scales, cooling control system for display fixtures, cash register, display fixture, retail environment monitors, frequent shopper database and data management system. The data management system contains several databases so that other devices attached to the network can access information about the products, including product type, specific heat capacities, product preparation recommendations, product storage recommendations and inventory control. As previously discussed, in order to code sensors for specific product types, information may be downloaded into the sensors from the data management system. The weigh scale also downloads relevant product information to calculate heat loads, as previously discussed. Cooling controls communicate with the display fixture to initiate the storage process. A point of sale device, such as a cash register, communicates with the data management system to provide product information to the customer and customer identification numbers as well as with the sensor so that the sensor can determine when all products have been sold or have passed their expiration dates. An environment monitor having current ambient temperatures and humidity conditions of the store is also accessible on the network. The data in the data management system can also be factored into a food safety plan so that corrective actions can be taken and records of food product temperature history data can be accessed when needed.

The present invention, as described with respect to food products, enables a consistent, cohesive approach to maintaining, as well as monitoring/tracking the temperature of food within preselected limits and keeping track of that data for both the buyer and seller.

It will be apparent to those skilled in the art that many changes and substitutions can be made to the preferred embodiment herein described without departing from the spirit and scope of the present invention as defined by the following appended claims.

| LIST OF COMPONENTS (For Convenience Of The Examiner | |
|---|---|
| 80 | network interface |
| 90 | display fixture |
| 100 | sensor |
| 102 | input probe |
| 104 | output interface |
| 106 | first status LED |
| 108 | second status LED |
| 110 | third status LED |
| 112 | fourth status LED |
| 114 | fifth status LED |
| 116 | sixth status LED |
| 118 | keypad |

What is claimed is:

1. A method of food safety control, said method comprising the steps of:
   a. associating a moveable, reusable sensor directly with a food product, said sensor capable of measuring, reading and transmitting data related to at least one parameter associated with the product;
   b. transmitting said data from said sensor to a data management system in communication with said sensor;
   c. moving said food product with said sensor to a display fixture; and
   d. monitoring said at least one parameter associated with said food product.

2. The method according to claim 1, wherein said at least one parameter is the temperature of said product.

3. The method according to claim 1, wherein said step of communicating includes transmitting data by infrared transmitter.

4. The method according to claim 1, further comprising the step of printing out data related to said at least one parameter on a label for said product.

5. The method according to claim 1, further comprising the steps of:
   a. preparing said food product after said sensor is associated therewith and before said product is moved to said display fixture; and
   b. monitoring said at least one parameter when during said preparation step.

6. The method according to claim 1, further comprising the step of programming said sensor with information relating to said food product.

7. The method according to claim 6, wherein said information includes the heat capacity of said food product.

8. The method according to claim 1, further comprising the step of simulating said data related to said at least one parameter.

9. A method of food safety control, said method comprising the steps of:
   a. associating a moveable, reusable sensor directly with a food product, said sensor capable of measuring, reading and transmitting data related to at least one parameter associated with the product;
   b. transmitting said data from said sensor to a data management system in communication with said sensor;
   c. moving said food product with said sensor to a display fixture;
   d. monitoring said at least one parameter associated with said food product;
   e. having at least one parameter be the temperature of said food product;
   f. calculating a heat-load for said display fixture; and
   g. determining if said display fixture can adequately cool said food product before moving said product to said display fixture.

10. A method of food safety control, said method comprising the steps of:
    a. associating a moveable, reusable sensor directly with a food product, said sensor capable of measuring, reading and transmitting data related to at least one parameter associated with the product;
    b. transmitting said data from said sensor to a data management system in communication with said sensor, said communication being comprised of transmitting data by infrared transmitter;
    c. moving said food product with said sensor to a display fixture;
    d. monitoring said at least one parameter associated with said food product;
    e. having at least one parameter be the temperature of said food product;
    f. calculating a heat-load for said display fixture;
    g. determining if said display fixture can adequately cool said food product before moving said product to said display fixture;
    h. printing data related to said at least one parameter on a label for said product;
    i. preparing said food product after said sensor is associated therewith and before said product is move to said display fixture;
    j. monitoring said at least one parameter when during said preparation step;
    k. programming said sensor with information relating to said food product, wherein said information includes the heat capacity of said food product;
    l. simulating said data related to said at least one parameter, said simulating step being achieved by measuring said at least one parameter for a period of time to accumulate actual data and using said actual data to benchmark simulated data based on algorithms.

11. A method for monitoring temperature of food products, said method comprising the steps of:
    a. associating a moveable, reusable sensor directly with a food product, said sensor adapted to monitor temperature;
    b. transmitting temperature data from said sensor to a data management system;
    c. maintaining said sensor with said food product as said food product is moved; and d. printing said temperature data onto a label for said food product.

12. The method as recited in claim 11, wherein said sensor collects data continuously.

13. The method as recited in claim 11, wherein said printing step is accomplished using a weighscale printer.

14. A method for monitoring temperature of food products, said method comprising the steps of:
  a. associating a moveable, reusable sensor directly with a food product, said sensor adapted to monitor temperature, said sensor comprising a temperature probe;
  b. attaching said temperature probe to said food product;
  c. collecting data related to the temperature of said food product with said probe;
  d. collecting data related to the temperature of the environment of said food product;
  e. comparing the temperature of said environment to the temperature of said product;
  f. using said comparison to predict the temperature of said product based on the temperature of said environment of said food product;
  g. transmitting temperature data from said sensor to a data management system;
  h. maintaining said sensor with said food product as said food product is moved; and
  i. printing said temperature data onto a label for said food product.

15. A method for monitoring temperature of food products, said method comprising the steps of:
  a. associating a moveable, reusable sensor directly with a food product, said sensor adapted to monitor temperature, said sensor comprising a temperature probe;
  b. attaching said temperature probe to said food product;
  c. collecting data related to the temperature of said food product with said probe;
  d. collecting data related to the temperature of the environment of said food product;
  e. comparing the temperature of said environment to the temperature of said product;
  f. using said comparison to predict the temperature of said product based on the temperature of said environment of said food product;
  g. transmitting temperature data from said sensor to a data management system;
  h. maintaining said sensor with said food product as said food product is moved; and
  i. printing said temperature data onto a label for said food product; and
  j. removing said temperature probe from said food product.

16. A system for monitoring food product temperature, said system comprising:
  a. a sensor adapted to be associated with a product and for measuring temperature data and transmitting said temperature data;
  b. a display fixture capable of holding food products;
  c. a data management system for receiving temperature data transmitted by said sensor;
  d. a printer for printing labels for said food products, said printer being in electrical communication with said data management system so that temperature data may be received by said printer and printed on said label; and
  e. means in operational connection with said display fixture for cooling said display fixture, said cooling means responsive to temperature data transmitted to said data management system by said sensor so that said cooling means keeps said display fixture within a preselected temperature range.

17. The system as recited in claim 16, further comprising a food preparation area in spaced relation to said display fixture and adapted for preparation of said food products, said sensor remaining associated with said food product when said food product is moved between said food preparation area and said display fixture.

18. The system as recited in claim 16, further comprising a food storage facility in spaced relation to said display fixture, said food storage facility adapted to store food products at a temperature within said preselected range while said display fixture is not at a temperature within said preselected range.

19. The system as recited in claim 16, wherein said sensor includes an alarm to indicate when said food product with which said sensor is associated is not at a temperature within said preselected range.

20. The system as recited in claim 16, further comprising means for calculating the heat load of a product and determining, based on said heat load calculation, whether said display fixture can maintain said product at a temperature within said preselected range when said product is first placed in said display fixture.

* * * * *